United States Patent [19]
Radcliffe

[11] Patent Number: 5,877,962
[45] Date of Patent: Mar. 2, 1999

[54] CART

[76] Inventor: Frederick W. Radcliffe, 3472 Kelso Crescent, Mississauga, Ontario, Canada, L5L 4R3

[21] Appl. No.: 576,900

[22] Filed: Dec. 22, 1995

Related U.S. Application Data

[62] Division of Ser. No. 140,499, Oct. 25, 1993, Pat. No. 5,505,473.

[51] Int. Cl.[6] ......................................................... B62B 3/10
[52] U.S. Cl. ............... 364/478.03; 364/403; 340/825.49; 280/79.2
[58] Field of Search ..................................... 180/273, 290; 280/79.2, 79.3, 79.4; 340/825.08, 825.33, 825.35, 825.54, 825.49, 825.27; 364/401, 403, 478.03; 235/385; 414/274

[56] References Cited

U.S. PATENT DOCUMENTS

| | | | |
|---|---|---|---|
| 4,821,197 | 4/1989 | Kenit et al. | 364/478.03 |
| 5,040,690 | 8/1991 | van der Shoot | 280/79.3 |
| 5,113,349 | 5/1992 | Nakamura et al. | 364/478.03 |
| 5,235,164 | 8/1993 | Nogama et al. | 364/478.03 |
| 5,323,327 | 6/1994 | Carmichael et al. | 364/478.03 |
| 5,383,111 | 1/1995 | Homma et al. | 364/403 |

*Primary Examiner*—Richard M. Camby
*Attorney, Agent, or Firm*—Eugene J.A. Gierczak

[57] ABSTRACT

An inventory retrieval method is disclosed for use with a central order desk computer. The computer has a database containing inventory unit identification related to specific storage locations in a warehouse. One or more inventory retrieval carts are provided, each cart having a number of containers suitable for receiving inventory picked from designated storage locations. Each cart has a display, and communicates with the computer by radio transmission. According to the method multiple orders are received at the computer. Each order is assigned to a container on an assigned cart. The computer sends successive pick locations to the cart, and the cart operator fills the containers on the cart according to the symbol received from the computer.

4 Claims, 9 Drawing Sheets

CART

This is a division of U.S. application Ser. No. 08/140,499 filed Oct. 25, 1993 now Pat. No. 5,505,473.

FIELD OF INVENTION

This invention relates to a cart for carrying units and communicating with a computer by means of broadcast and particularly relates to a mobile cart for carrying different units and for communicating with the computer by radio frequency the location and quantity of the units to be carried by the cart.

BACKGROUND TO THE INVENTION

Various cart apparatus and inventory management systems have heretofore been devised.

For example U.S. Pat. No. 4,363,496 discloses a material handling cart which provides for the transportation and storage of material handling totes in manageable quantities. The material handling cart includes a pair of spaced parallel, vertical members interconnected by a plurality of equidistantly spaced horizontal support rails. A forwardly and downwardly projecting support leg is connected to each of the vertical members and terminates in a vertical portion remote from the connection to the vertical members. A first pair of fixed casters are mounted to the bottom of each of the vertical members and a second pair of rotatable casters are mounted in the ends of each of the vertical portions of the support legs. The material handling cart has curved handle portions and hand grips in order to manoeuvre the material handling cart. The parallel horizontal support rails are structured in order to accommodate material handling totes of the type disclosed in U.S. patent application No. 212,946.

In another example, U.S. Pat. No. 3,834,725 discloses a trolley adapted to hold or to exhibit things or articles of different kinds. The trolley has a plurality of vertically stacked tray-like horizontal containers which are connected to one another by three uprights. The upper and lower containers are fixed to the uprights and the intermediate containers are revolvable on bearings. The trolley has casters attached to each of the three uprights beneath the base container to permit the trolley to be rolled about on a horizontal surface. The trolley also allows for the attachment of accessories to customize the trolley to assist the operator in their task.

Another device is described in U.S. Pat. No. 4,920,488 which discloses a method for the inventory of a large number of items having the following steps:

(a) bar code labels are attached to each item to uniquely identify such item;

(b) portable hand held bar code readers read the bar code labels on each item and an operator inputs their absolute geographic location in terms of latitude, longitude and elevation (within one foot of accuracy) in association with the specific bar code;

(c) the information obtained by the portable hand held bar code reader is transferred to a digital computer system and that information is use to update the inventory records, each bar code designation being associated with its geographic location.

U.S. Pat. No. 4,636,950 discloses an inventory management system using transponders associated with specific products. This inventory management system requires the securement to an inventory unit of a micro-electronic transponder having on it an identifiable and coded identification which can communicate with computer controllers and automated data processors. The computer controllers transmit signals which activate the micro-electronic transponder associated with the inventory unit allowing the operator to locate the inventory unit and to engage in inventory analysis.

Finally, U.S. Pat. No. 4,025,766 discloses an inventory recordation and processing system. This system incorporates a platform for attachment to the operator in order to support instrumentation having an alpha-numeric keyboard, calculator and display which is connected to a data-recorder for processing inventory data in a rapid, efficient and accurate manner without the use of written documentation. The data is inputted into the data-recorder on site. Thereafter the data-recorder is connected to a decoder and the information is used to update the inventory records.

Each of said prior art devices referred to above present relatively complicated devices having limited utility.

Moreover, the prior art devices utilized heretofore relate to structures which provide picking of units one order at a time. Such prior art devices do not provide for mobile multiple pickings.

Accordingly, it is an object of this invention to provide an improved cart and inventory control procedure.

Finally, it is an aspect of this invention to provide a method for multiple order picking and inventory control of units at a pick location in a warehouse, including the steps of: affixing to each unit a code representing that pickable unit and its pick location in the warehouse; inputting said codes into a computer; inputting multiple customer orders into the computer; assigning each of said multiple customer orders to a container on an assigned cart transmitting sequentially from said computer to said cart pick locations for each of said multiple customer orders to a radio frequency terminal an assigned cart by means of radio frequency broadcast; moving a cart carrying radio frequency terminal to pick location displayed on the radio frequency terminal; verifying proper pick location; displaying the quantity of units to be placed in a container carried by the cart; picking displayed quantity of units for placement into appropriate container; manually communicating with the radio frequency terminal to indicate the pick at the location is completed and transmitting the communication to the computer; receiving the next instructions from the computer concerning the next designated pick location; repeating moving, verifying, picking and communicating steps sequentially until assigned multiple customer orders have been picked.

DRAWINGS

These and other objects and features will now be described in relation to the following drawings.

DESCRIPTION OF THE INVENTION

Like parts will be given like numbers throughout the figures.

Figure 1:
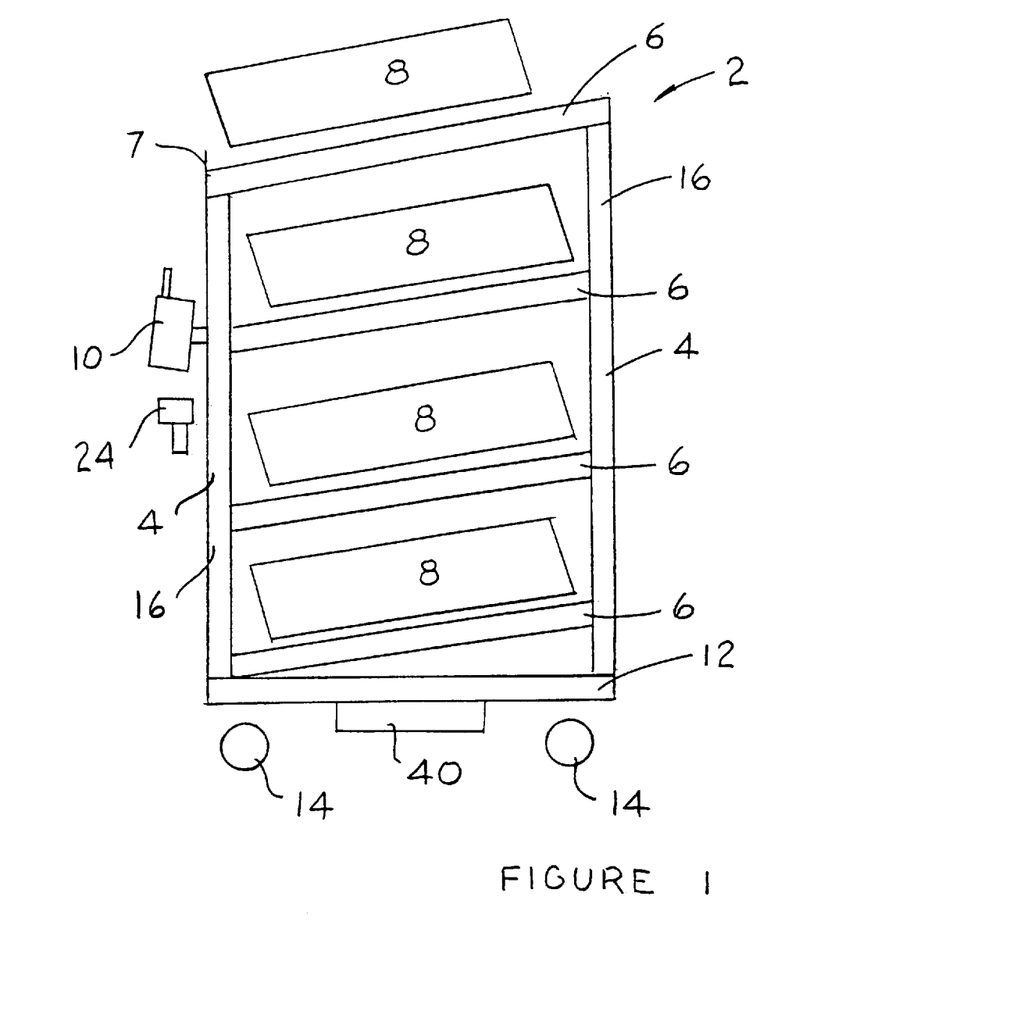
FIG. 1 is a side elevation view of a cart of the present invention.

FIG. 1 illustrates a side elevation view of the cart 2.

The cart 2 includes a frame 4, a plurality of shelf means 6, a plurality of containers 8 and radio frequency terminal means 10.

The frame 4 includes a base 12 which has depending therefrom rollers or wheels 14. The base 12 may be comprised of any suitable material including metal, plastic or the like. The wheels or casters 14 are suitably fastened to the base 12 so as to permit the cart 2 to be pushed or manipulated within a warehouse. Accordingly, the cart 2 is mobile.

The base 12 has at least one upstanding vertical member 16. In the embodiment illustrated in FIG. 1, a number of up-standing vertical members 16 are provided.

The frame 4, and particularly the up-standing vertical members 16 are adapted to carry a plurality of shelves 6. In the embodiment shown in FIG. 1, a pair of four vertically stacked shelves 6 are provided.

Figure 10:
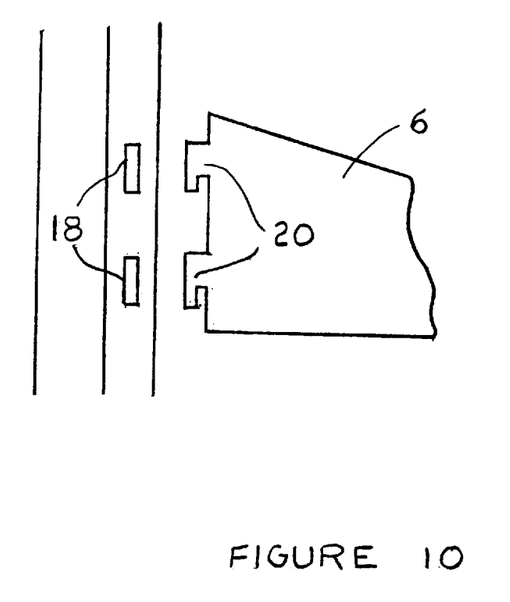
FIG. 10 is a partially exploded view of shelf and frame of the storage location of FIG. 7.

The shelves 6 may be fixed or moveable as shown in FIG. 10 where the vertical members have a plurality of apertures 18 adapted to receive projections 20.

Figure 2:
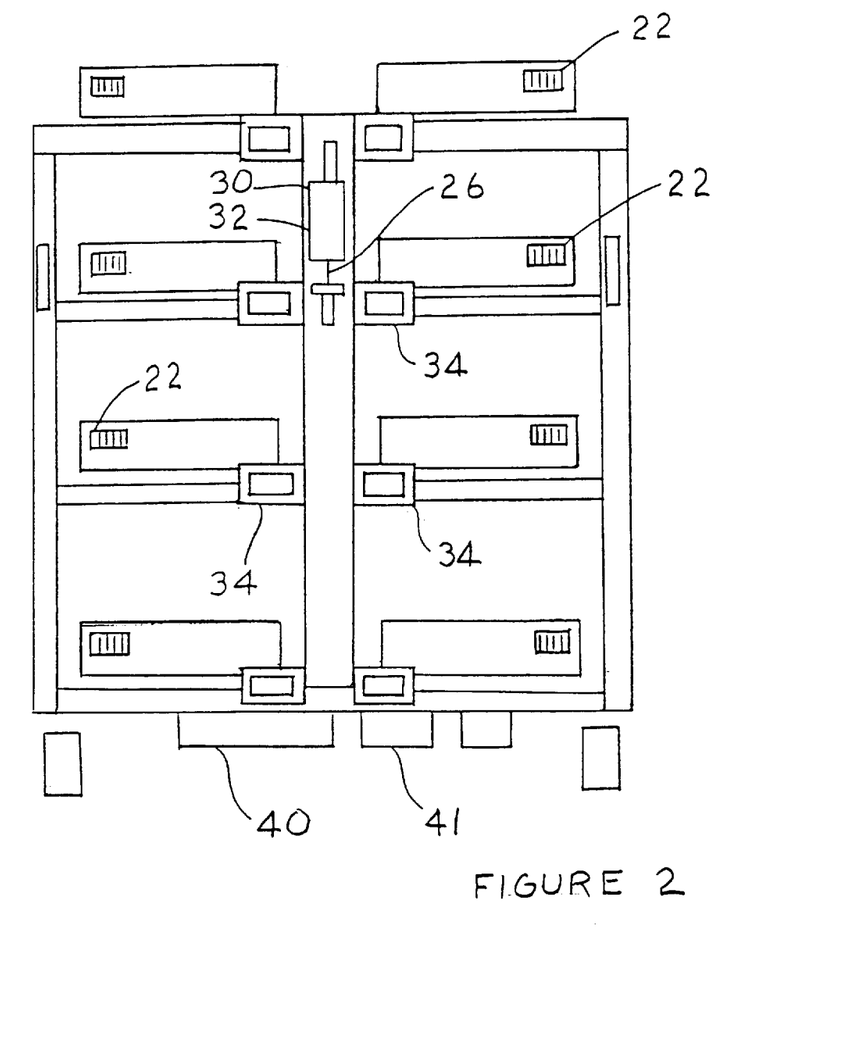
FIG. 2 is a front elevation view of the cart of FIG. 1.
Figure 3:
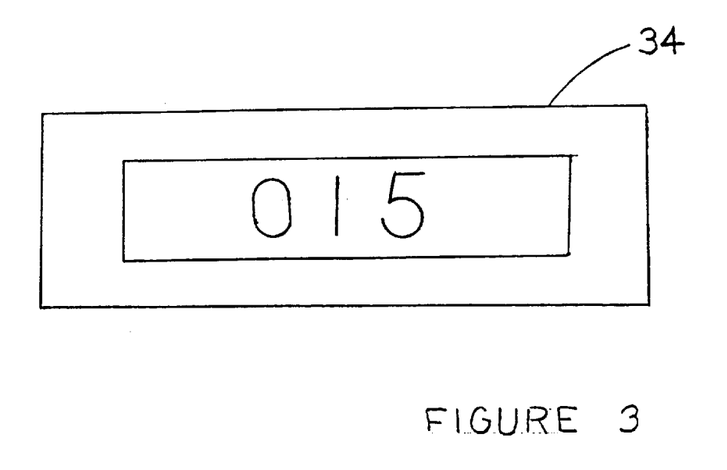
FIG. 3 is front elevation view of a display unit of the cart of FIG. 1.
Figure 4:
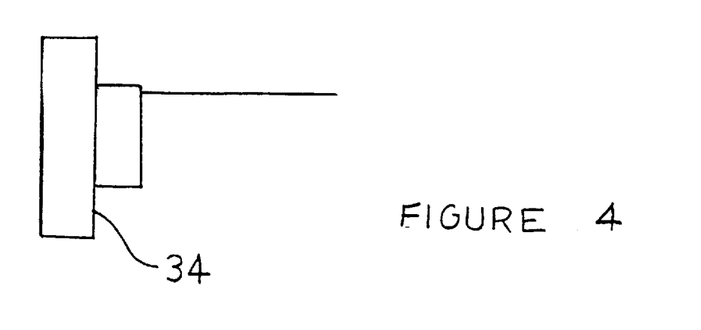
FIG. 4 is a side elevation view of the display unit of FIG. 3.

The cart 2 also includes a plurality of containers 8 which are adapted to be carried by the shelves 6. Any number of containers 8 may be utilized and in the embodiment shown in FIG. 1 consist of eight containers. The containers are identified by means of bar codes 22 and a corresponding numeric or alpha-numeric sequence as shown in FIG. 2. The shelves 6 are on an incline and have a lip 7 to counterbalance the force placed on the container 8 from being placed on an incline, thereby preventing the containers 8 from sliding off the shelves 6.

The bar codes 22 of the containers may be read by using a scanner such as a bar code scanner 24 which is associated with the cart 2. In particular, the scanner 24 electronically communicates with the radio frequency terminal 10 by means of a wire 26 which is connected to and powered by the radio frequency terminal 10. Alternatively, the radio frequency terminal 10, scanner 24 and displays 34 may be powered by a rechargeable battery 41.

The radio frequency terminal 10 may comprise any number of units which are available in the marketplace for receiving signals from a computer by means of radio frequency or broadcast such as, for example, a radio frequency terminal known by the trademark and model number TELXON PTC-860 RF or TEKLOGIX 7025 RF.

Figure 5:
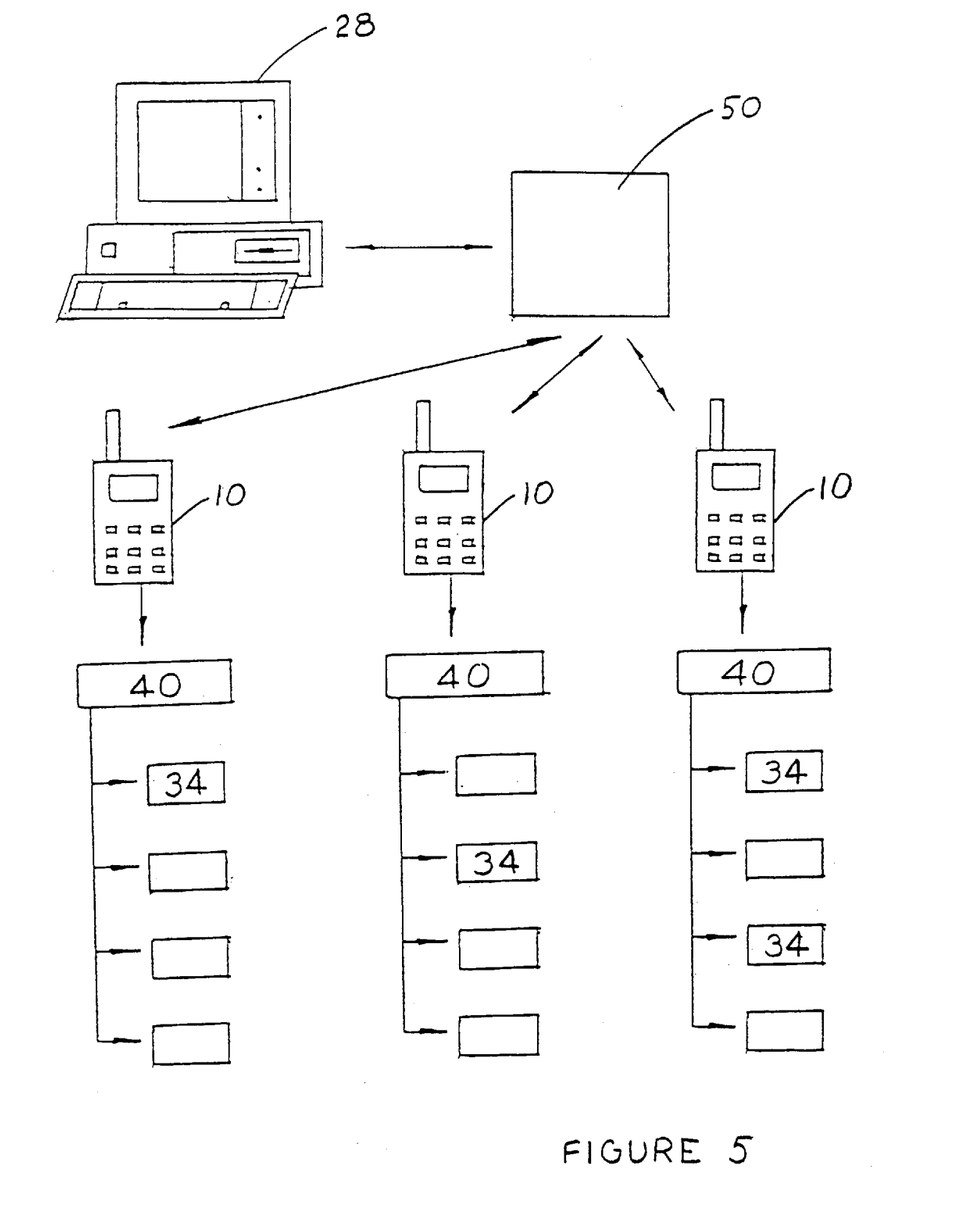
FIG. 5 is a schematic view of a computer, radio frequency broadcast equipment and three terminals on three separate carts of the invention of FIG. 1.

In particular, the radio frequency terminal 10 is associated with the frame 4 and the terminal 10 communicates with the computer 28 via a radio frequency transmitter 50. The computer 28 is programmed to accept multiple orders. In particular, the computer may be programmed so as to identify a particular customer, the parts or units which the customer requires as well as the location of the parts or units in the warehouse. A series of orders may be inputted and such orders coded and transmitted to the radio frequency terminal 10. Accordingly, the terminal 10 communicates with the computer 28 for receiving data regarding the placement of parts onto the shelves 6, and particularly into the containers 8.

Moreover, the terminal 10 also includes a screen 30 for displaying information or data communicated from the computer 28 as well as a plurality of buttons or alphanumeric keyboard 32 which permits communication with the computer. In particular, the terminal 10 displays and permits the following manipulations or steps, namely:

RECEIVE
PUT AWAY
PICK
PACK
MOVE/REFILL
COUNT
INQUIRY
LOG ON/OFF
STATUS

Figure 9:
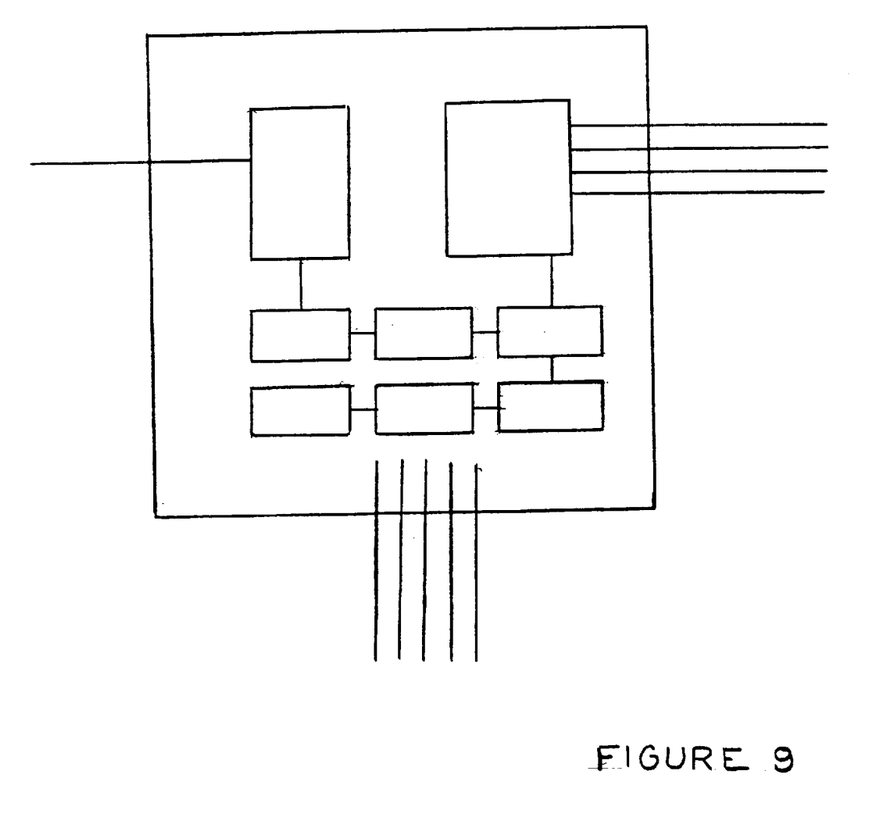
FIG. 9 is a representative view of the connection between the terminal (not shown) direct control unit, displays and power pack.

The cart 2 also includes a plurality of displays 34 associated with each of the plurality of shelves 6 and particularly the containers 8. The displays 34 are hard wired to a display control unit 40 which is hard wired to the terminal 10. The terminal 10 instructs the display control unit 40 of the number of units which are to be placed into the appropriate containers 8, and the display control unit 40 communicates with the individual displays 34 resulting in the activation or deactivation of the quantity readout 38 on the individual displays 34.

The radio frequency terminal 10 is a radio frequency/direct communication programmable terminal which is located on the front of the cart 2. In particular, the cart 2 includes a terminal housing which is mounted to cart 2, and which is adapted to receive and carry the terminal 10. The terminal 10 is connected by means of a RS232 serial port connection to a display control unit 40 which is mounted out of sight on the cart. Each of the displays 34 are connected to the display control unit (not shown). There is one quantity readout 38 for each of the containers or totes 8.

In the embodiment shown the radio frequency terminal 10 is mounted on the cart 2 by using an adjustable angle bracket housing 36. The display control unit 40 is an electronic switch which receives a coded signal from the radio frequency terminal and activates or deactivates each individual display 34. The display control unit and the displays may be powered by a separate power source 40 mounted on the cart; for example on the underside of the base of the cart. The power source is rechargeable and it is optional to mount the recharger on the cart.

The cart 2 and the method for multiple order picking and inventory control of units in the warehouse shall now be described.

The method includes affixing a code which could be a machine readable code to each of the pickable units and/or storage location for each of the pickable units which is to be involved in the multiple order picking process or which is to be added to the multiple order picking process. After affixing the codes to the specific storage locations and/or pickable units, the unit identifiers which represent the units located in each specific storage location may be input to the computer system thereby creating a data base in which each unit in the warehouse is related to a location.

Orders from customers are entered into the computer 28, and the computer software will organize and sort orders in addition to assigning the orders to an operator or cart for picking. After activating the battery or power source in the radio frequency terminal 10, information from the computer 28 may be communicated to the terminal 10, and information such as:

(a) operator identification;

(b) container 8 availability, input by activating the scanner 24 to read the machine readable bar codes 22;

may be entered by the operator for communication to the computer 28 by means of radio frequency communication.

Alternatively, the operator may input manually each of the container 8 codes using the radio frequency terminal's 10 alpha-numeric keyboard. This information is transmitted to the computer 28 by means of radio frequency.

Thereafter, the method consists of assignment by the computer 28 to the operator of the radio frequency terminal 10 a batch of orders for picking by the operator or the system may be formatted such that the operator will obtain a number of containers which have orders pre-assigned and corresponding to the bar code identifier.

Accordingly, the computer 28 will initially transmit to the radio frequency terminal 10 initial pick location instructions for the batch of orders. The operator will then manually move the cart to the designated pick locations in the warehouse displayed on the radio frequency terminal 10. The operator will then verify the proper pick location using the scanner 28 to scan the machine readable codes of the units or location of the unit or the operator may enter manually the pick location code using the alpha-numeric keyboard 32 on the radio frequency terminal 10.

If the verification indicates an incorrect location further instructions will be provided to the operator on the radio frequency terminal 10 readout to assist the operation in locating the correct designated pick location. Where the verification indicates the correct location, the display 34 will activate causing each display 34 to display the number or quantity of unit or parts required to be placed in the corresponding container 8.

Thereafter, the operator will pick the displayed quantity of units on the quantity readout display and placement of units into the appropriate container 8 will be undertaken by the operator. When the placement of the units is complete the operator will input into the radio frequency terminal 10 the appropriate command using the alpha-numeric keyboard 32 indicating that the pick at the location is complete. Input of that command will deactivate the display units 34 and simultaneously initiate a transmission to the computer 28 by means of broadcasting, advising the computer 28 of the completion of the pick at the specified location, resulting in a re-transmission by the broadcasting computer 28 to the radio frequency terminal 10 of the next designated pick location instruction.

Thereafter the operator will, again, repeat the following steps:

(a) manipulating the cart having the radio frequency terminal to the next designated pick location as displayed on the radio frequency terminal 10;

(b) verifying the proper pick location by using the scanner 24 to scan the machine readable bar codes as designated above or entering the location identifier manually using the alpha-numeric keyboard;

(c) picking of the displayed quantity of units on the quantity readout display and placement into the appropriate container 8 will be undertaken by the operator and when completed the operator will input into the radio frequency terminal 10 the appropriate command using the alpha-numeric keyboard again, indicating that the pick at the location is completed.

This process is repeated until the assigned batch of orders has been picked by the operator causing the radio frequency terminal 10 to display on its screen information advising the operator that the pick is complete.

Thereafter the operator will enter into the terminal 10 that they are available, and the computer 28 will assign another batch of orders or the operator will obtain a number of containers having pre-assigned orders and will thereafter pick the batch of orders as previously described.

Accordingly, the method and cart used above may be utilized to pick a different quantity of different parts or units for each of the containers 8.

Moreover, the operator may inquire through use of radio frequency terminal 10 information such as:

(a) container availability;

(b) quantity changes;

(c) product location changes, or other inquiry information, and will be able to receive the information instantaneously. Corrections to inventory counts may also be made instantaneously.

Figure 7:
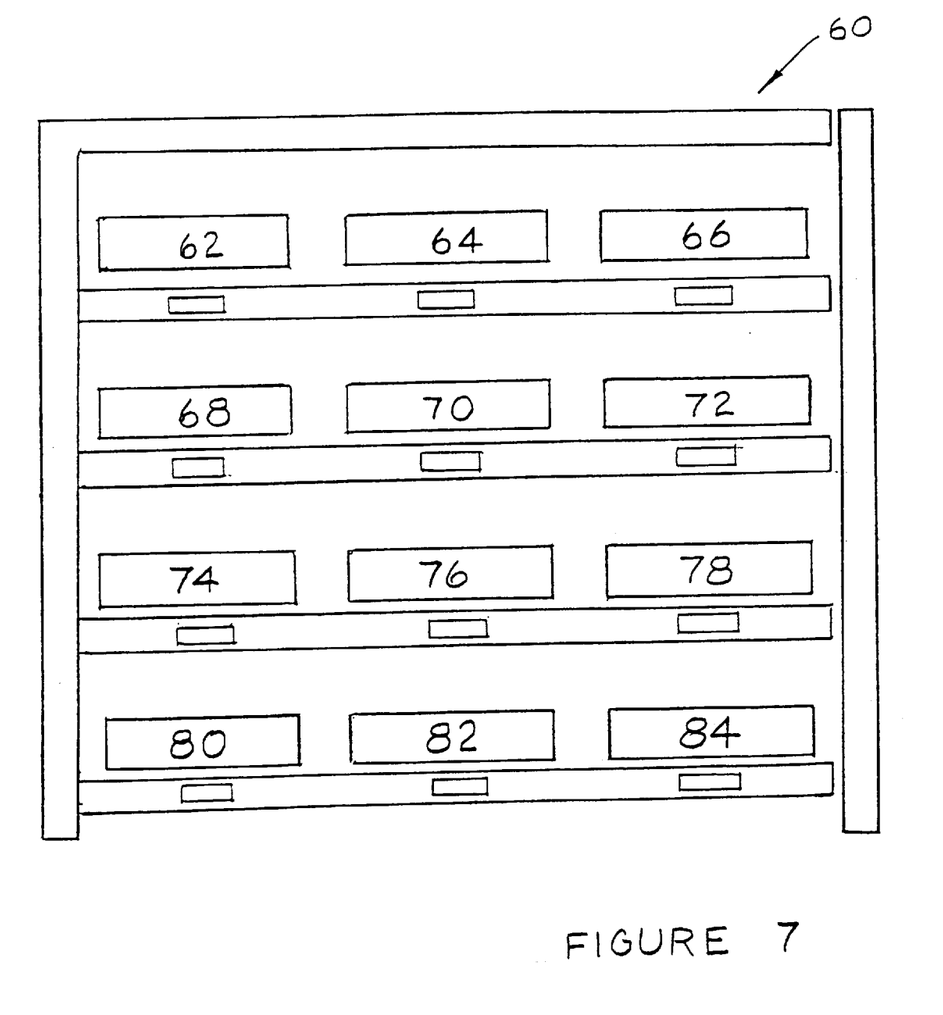
FIG. 7 is a front elevation view of a storage location of the present invention.

The units or parts may be stored in any number of locations or devices in a warehouse, including shelving systems 60 as shown in FIG. 7. Each of the individual shelf compartments 62 includes a number of individual shelf compartments 62, 64, 66 . . . 84 as shown in FIG. 7. Each of the individual shelf compartments may contain different parts or units. In other words, shelf compartment 62 may contain a number of the same units which are different than the number of the same units located in shelf unit 64 and so on. The shelving system 60 will be given a machine readable address code as will the individual shelf compartments 62, 64, 66 . . . 84. Each of the shelf compartments may include light beacons 92 which may light up to assist the location of a particular cart to be picked. The beacon lights can be formatted by section such that the pick location will refer to the section address 43 and not a bin location. When the operator arrives to pick at a location incorporating beacon lights the operator will verify the section location and the computer 28 will light up a beacon light representing a bin and the display units will turn on indicating the number of units to be picked. The alpha-numeric keyboard on the terminal will be used to indicate a pick in the specific bin is complete and a new beacon light will turn on within the section, the process is repeated until there are no more units required to be picked from the section, and the operator will be advised through the terminal 10 of the next pick-site location.

The computer in FIG. 5 can be utilized to control a plurality of terminals 10 located on a plurality of carts 2. Each of the terminals 10 are connected to a display control unit 40 and the displays 34 are connected to the display control unit 40.

Figure 6:
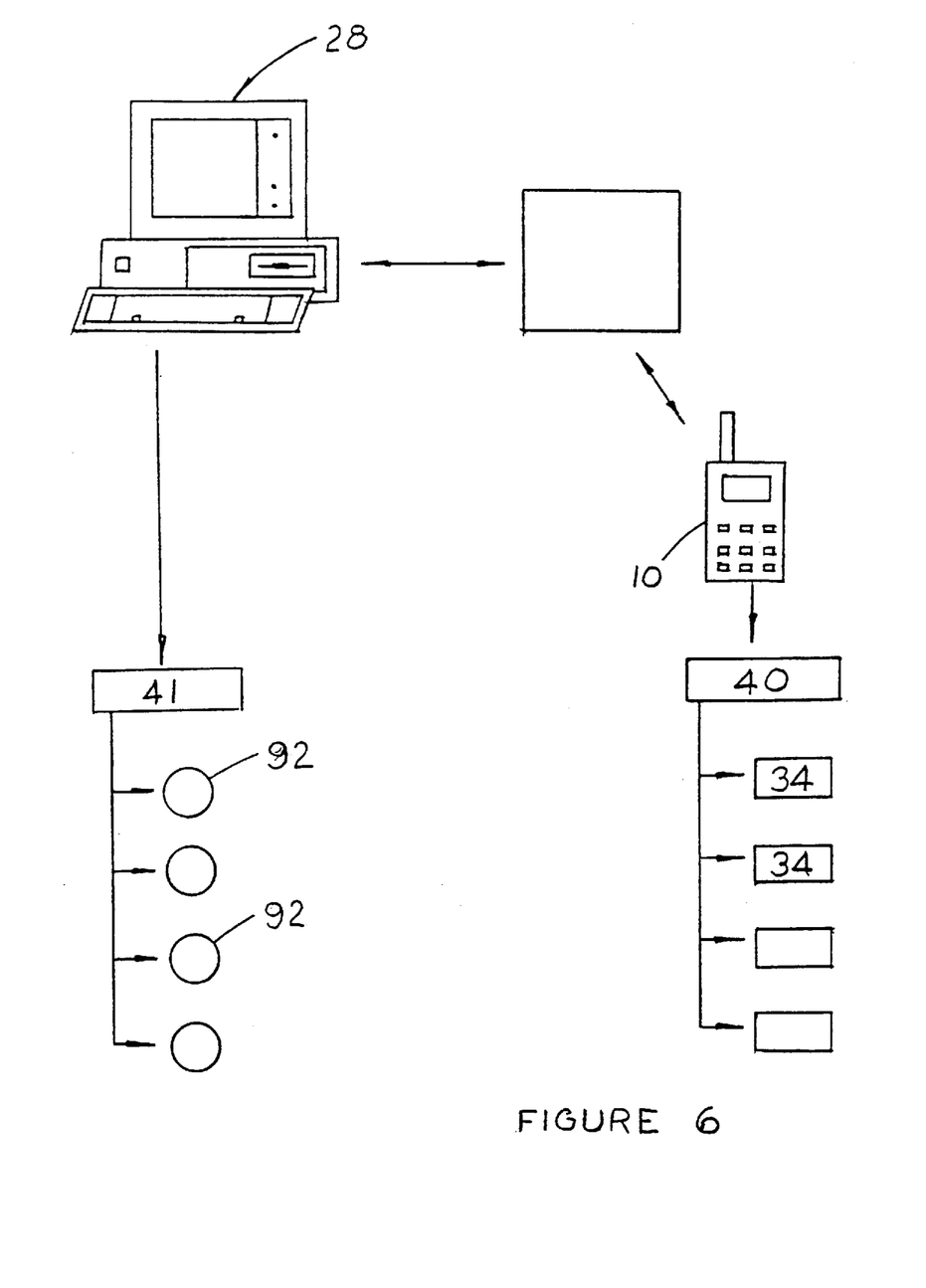
FIG. 6 is a schematic view of the computer, radio frequency broadcast equipment, one terminal on one cart of the invention of FIG. 1 and beacon lights thereon.
Figure 8:
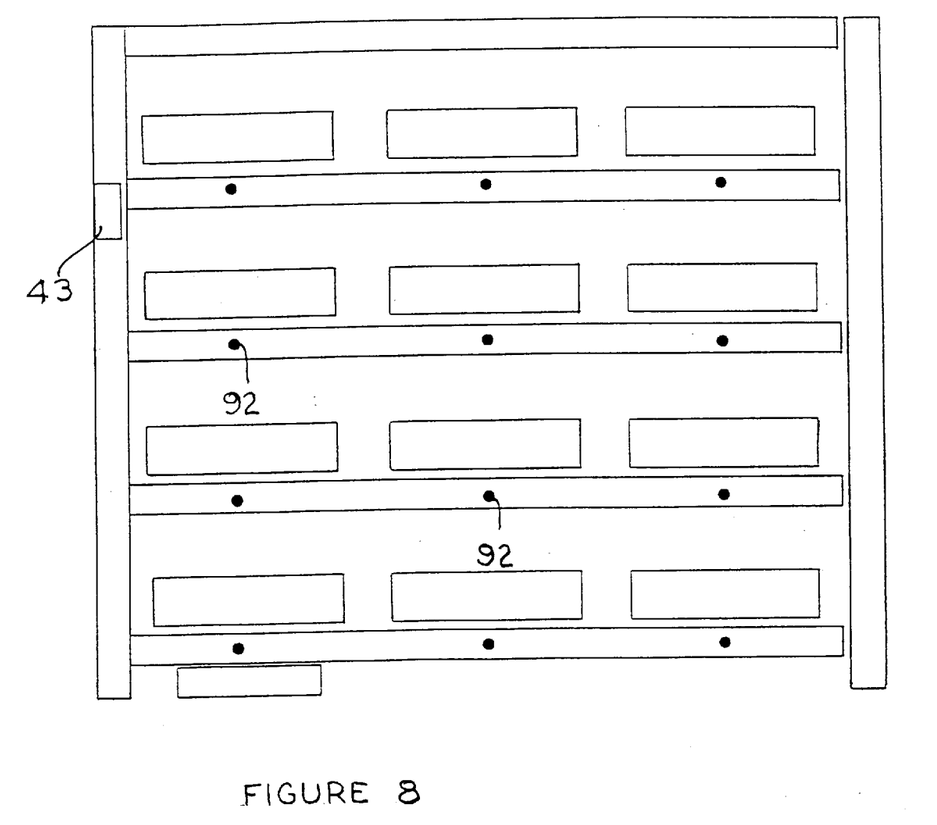
FIG. 8 is a front elevation view of the storage location of FIG. 7 incorporating indicator lights.

Moreover FIG. 6 illustrates the computer 28 which controls one terminal 10 mounted on a cart 2 and which also controls and is communicating with a beacon display control unit 41 mounted on the shelf system 60 or the like. The beacon display control unit 41 will light up the appropriate beacons 92 as shown in FIG. 8.

Although the preferred embodiments as well as the operation and use have been specifically described in relation to the drawings, it should be understood that variations in the preferred embodiment can be achieved by a person skilled in the art without departing from the spirit of the invention. It is therefore intended that the foregoing detailed description be regarded as illustrative rather than limiting and that it be understood that it is the foregoing claims, including all equivalents that are intended to define the scope of this invention. Accordingly, the invention should not be understood to be limited to the exact form revealed by the drawings.

The embodiments of the invention in which an exclusive property or privilege is claimed are defined as follows, I claim:

1. A method for multiple order picking and inventory control for units at pick locations in a warehouse, that method comprising:

(a) affixing to each unit a code representing each said unit and pick location in said warehouse;

(b) inputting said code into a computer;

(c) inputting multiple orders into said computer;

(d) assigning, by said computer, each of said orders to a container on an assigned cart, that cart having a radio terminal comprising a display;

(e) transmitting from said computer to said display a unit pick location for picking units to fill said orders assigned to said cart by means of radio broadcast;

(f) moving said cart to said pick location displayed on said display;

(g) verifying said pick location;

(h) displaying on said display a quantity of units to be picked at said pick location and placed in a container of said cart;

(i) picking said units and placing said units in said assigned containers;

(j) communicating by radio to said computer that picking at said location is complete; and (k) repeating said transmitting, moving, verifying, picking and communicating steps sequentially until said assigned orders have been filled.

2. The method of claim 1 further including the step of delivering said cart with said containers to a designated area for packing, shipping and co-ordination with other packages for shipment and delivery to a customer.

3. The method of claim 1 wherein said units are warehoused in shelves and said shelves include indicator lights activated by an indicator light display control unit which is controlled by said computer to assist in locating said pick location.

4. The method of claim 1 including the step of up-dating said inventory records of said units and permitting inquiries of inventory records.

* * * * *